US009965834B2

(12) United States Patent
Sambongi et al.

(10) Patent No.: US 9,965,834 B2
(45) Date of Patent: May 8, 2018

(54) IMAGE PROCESSING APPARATUS AND IMAGE ACQUISITION APPARATUS

(71) Applicants: OLYMPUS CORPORATION, Hachioji-shi, Tokyo (JP); NATIONAL UNIVERSITY CORPORATION CHIBA UNIVERSITY, Chiba-shi, Chiba (JP)

(72) Inventors: Masao Sambongi, San Jose, CA (US); Norimichi Tsumura, Chiba (JP); Mayu Yokoya, Osaka (JP)

(73) Assignees: OLYMPUS CORPORATION, Tokyo (JP); NATIONAL UNIVERSITY CORPORATION CHIBA UNIVERSITY, Chiba-Shi, Chiba (JP)

(*) Notice: Subject to any disclaimer, the term of this patent is extended or adjusted under 35 U.S.C. 154(b) by 25 days.

(21) Appl. No.: 15/338,046

(22) Filed: Oct. 28, 2016

(65) Prior Publication Data

US 2017/0046819 A1    Feb. 16, 2017

Related U.S. Application Data

(63) Continuation of application No. PCT/JP2015/063072, filed on May 1, 2015.

(30) Foreign Application Priority Data

May 2, 2014    (JP) .................. 2014-095253

(51) Int. Cl.
*G06T 5/00*    (2006.01)
*G06T 5/50*    (2006.01)
(Continued)

(52) U.S. Cl.
CPC .............. *G06T 5/005* (2013.01); *G06T 5/50* (2013.01); *G06T 7/514* (2017.01); *G06T 7/593* (2017.01);
(Continued)

(58) Field of Classification Search
CPC .......... G06T 5/005; G06T 7/514; G06T 7/593; G06T 5/50; H04N 5/232
See application file for complete search history.

(56) References Cited

U.S. PATENT DOCUMENTS 6,256,035 B1    7/2001  Katayama et al.
7,002,623 B1    2/2006  Ohyama et al.
(Continued)

FOREIGN PATENT DOCUMENTS

JP        10097642 A     4/1998
JP       2000090233 A    3/2000
(Continued)

OTHER PUBLICATIONS

Hideki Mitsumine, et al., "A Technique for Changing Lighting Conditions in an Image-based Virtual Studio", NHK Science and Technical Research Laboratories R&D Report, No. 88, Nov. 2004, pp. 18-25.

(Continued)

*Primary Examiner* — David F Dunphy
(74) *Attorney, Agent, or Firm* — Holtz, Holtz & Volek PC

(57) ABSTRACT

Provided is an image processing apparatus including a transformation unit that is configured to deform images so that corresponding points in a plurality of images obtained from several viewpoints with respect to the same subject are matched; a separating unit that is configured to separate specular-reflection components from the plurality of images transformed by the transformation unit and create an image from which the specular-reflection component is removed; and an image reconstructing unit that is configured to combine at least one of the specular-reflection components of the plurality of images, separated by the separating unit, and the image from which the specular-reflection component is removed.

9 Claims, 13 Drawing Sheets

(51) Int. Cl.
*H04N 5/232* (2006.01)
*G06T 7/514* (2017.01)
*G06T 7/593* (2017.01)

(52) U.S. Cl.
CPC ... *H04N 5/232* (2013.01); *G06T 2207/10004* (2013.01); *G06T 2207/10052* (2013.01); *G06T 2207/20221* (2013.01)

(56) References Cited

U.S. PATENT DOCUMENTS

| | | | |
|---|---|---|---|
| 9,338,419 B2* | 5/2016 | Kitajima | G06K 9/46 |
| 2003/0011596 A1* | 1/2003 | Zhang | G06T 15/506 |
| | | | 345/426 |
| 2007/0132759 A1* | 6/2007 | Mallick | G06T 5/30 |
| | | | 345/426 |
| 2008/0231729 A1* | 9/2008 | Sato | G06T 3/4053 |
| | | | 348/229.1 |
| 2009/0028424 A1 | 1/2009 | Sato et al. | |
| 2010/0027879 A1 | 2/2010 | Sato et al. | |
| 2011/0305388 A1* | 12/2011 | Wedi | G06T 5/005 |
| | | | 382/165 |
| 2014/0093158 A1 | 4/2014 | Watanabe et al. | |
| 2016/0300376 A1* | 10/2016 | Fuse | G06K 9/4661 |
| 2017/0014029 A1* | 1/2017 | Azizian | A61B 5/7405 |

FOREIGN PATENT DOCUMENTS

| | | |
|---|---|---|
| JP | 2008135073 A | 6/2008 |
| JP | 2009290440 A | 12/2009 |
| JP | 5356590 B1 | 12/2013 |

OTHER PUBLICATIONS

International Search Report (ISR) and Written Opinion dated Aug. 4, 2015 issued in International Application No. PCT/JP2015/063072.

Marcelo Bertalmio, et al., "Image Inpainting", Proceeding of the 27th Annual Conference on Computer Graphics and Interactive Techniques, 2000, 8 Pages.

* cited by examiner

TRANSFORMED IMAGES

TRANSFORMED IMAGE → SPECULAR-REFLECTION COMPONENT + OTHER COMPONENTS

OTHER COMPONENTS → INTERPOLATE → INTERPOLATED IMAGE

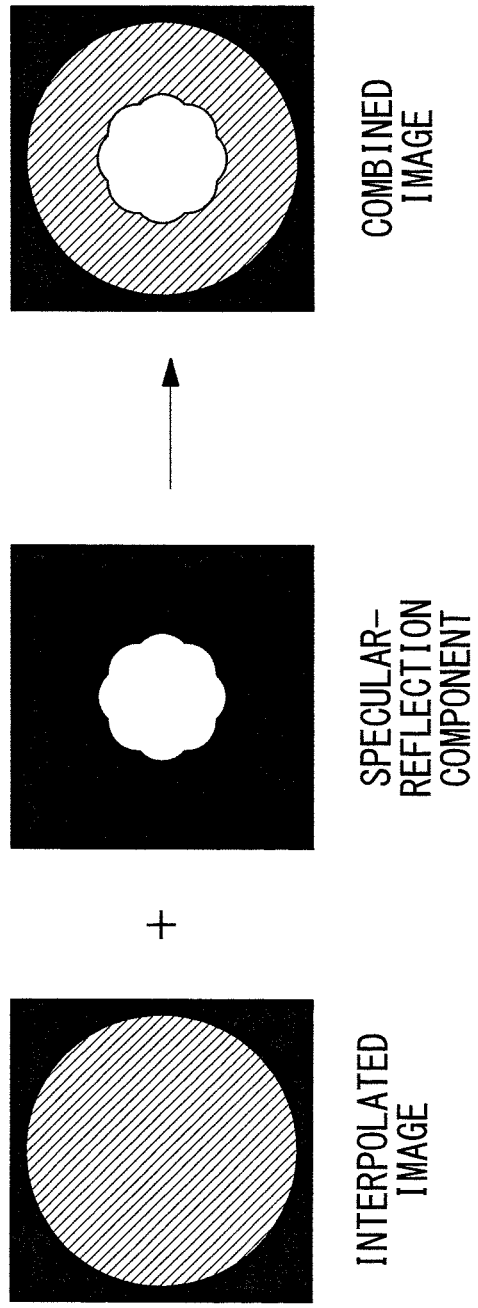

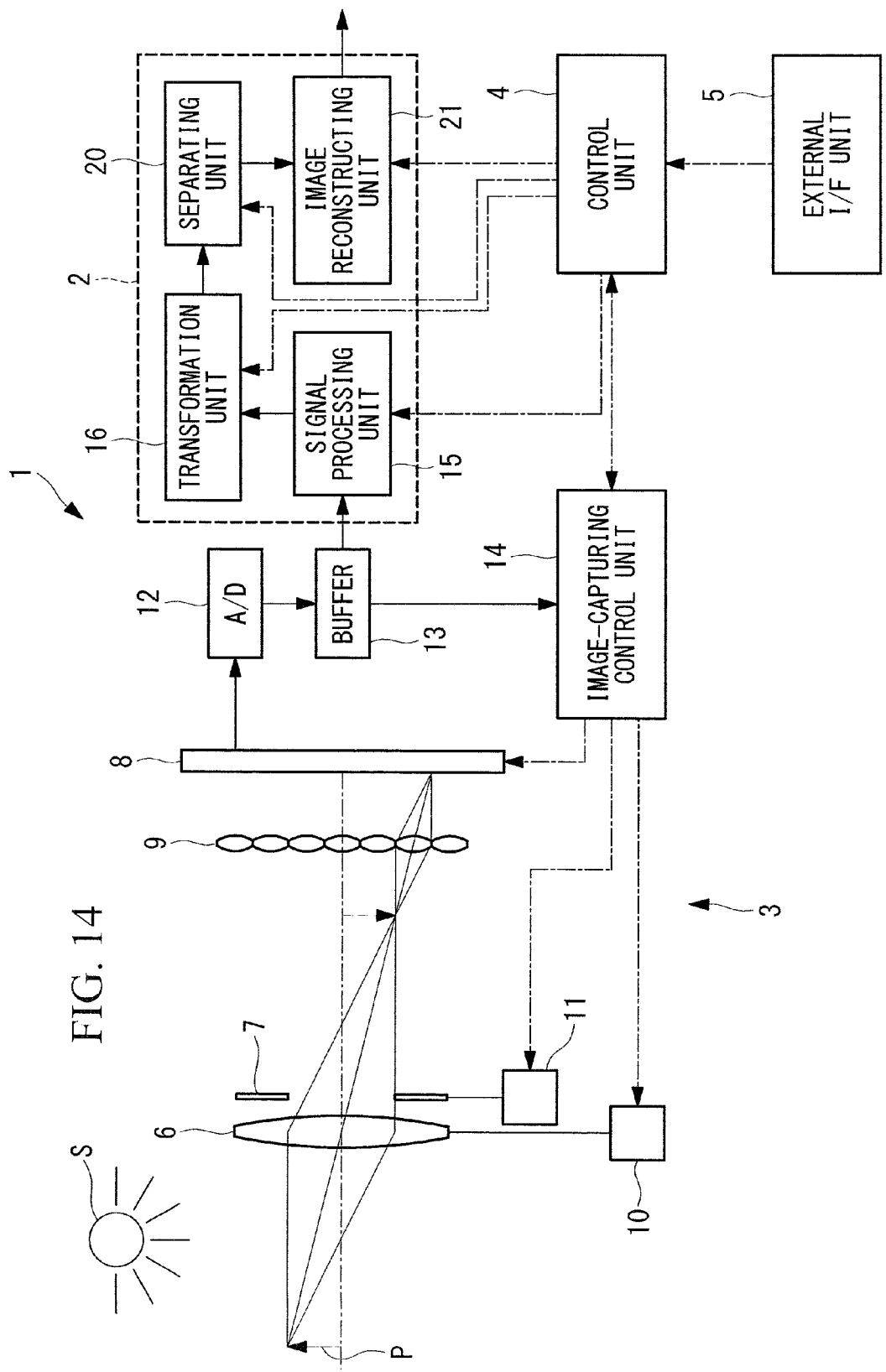

IMAGE PROCESSING APPARATUS AND IMAGE ACQUISITION APPARATUS

CROSS-REFERENCE TO RELATED APPLICATIONS

This is a continuation of International Application PCT/JP2015/063072, with an international filing date of May 1, 2015, which is hereby incorporated by reference herein in its entirety. This application claims the benefit of Japanese Patent Application No. 2014-095253, the content of which is incorporated herein by reference.

TECHNICAL FIELD

The present invention relates to an image processing apparatus and an image acquisition apparatus.

BACKGROUND ART

In the related art, there is a known image processing method for creating an image at an arbitrary viewing point from a set of images acquired at a plurality of viewing points (for example, see Patent Literature 1).

The arbitrary-viewing-point image created by this image processing method is an image in which the illumination position is fixed.

One of the factors making up the texture of a material is glossiness, and it is known that glossiness is perceived mainly according to the ratio of a specular-reflection component and a diffuse-reflection component at the surface of the material.

CITATION LIST

Patent Literature

{PTL 1}
Japanese Unexamined Patent Application, Publication No. HEI-10-97642

SUMMARY OF INVENTION

Solution to Problem

The present invention provides the following solutions.

An aspect of the present invention is an image processing apparatus including: a transformation unit that is configured to deform images so that corresponding points in a plurality of images obtained from several viewpoints with respect to the same subject are matched; a separating unit that is configured to separate specular-reflection components from the plurality of images transformed by the transformation unit and create an image from which the specular-reflection component is removed; and an image reconstructing unit that is configured to combine at least one of the specular-reflection components of the plurality of images, separated by the separating unit, and the image from which the specular-reflection component is removed.

Another aspect of the present invention is an image acquisition apparatus including an image obtaining unit that is configured to a plurality of images with several viewpoints with respect to the same subject; and one of the above-described image processing apparatuses.

With this aspect, the plurality of images from several viewpoints with respect to the same subject, obtained by the image obtaining unit, is processed by the image processing apparatus, whereby it is possible to create an image in which the position of the light source is changed virtually.

FIG. 13 shows another example of the image reconstructing unit in the image processing apparatus in FIG. 1, and is a diagram for explaining a case using the specular-reflection components combined in FIG. 12.

FIG. 14 is a diagram showing the overall configuration of a modification of the image processing apparatus and the image acquisition apparatus in FIG. 1.

DESCRIPTION OF EMBODIMENTS

An image acquisition apparatus 1 and an image processing apparatus 2 according to an embodiment of the present invention will be described below with reference to the drawings.

Figure 1:
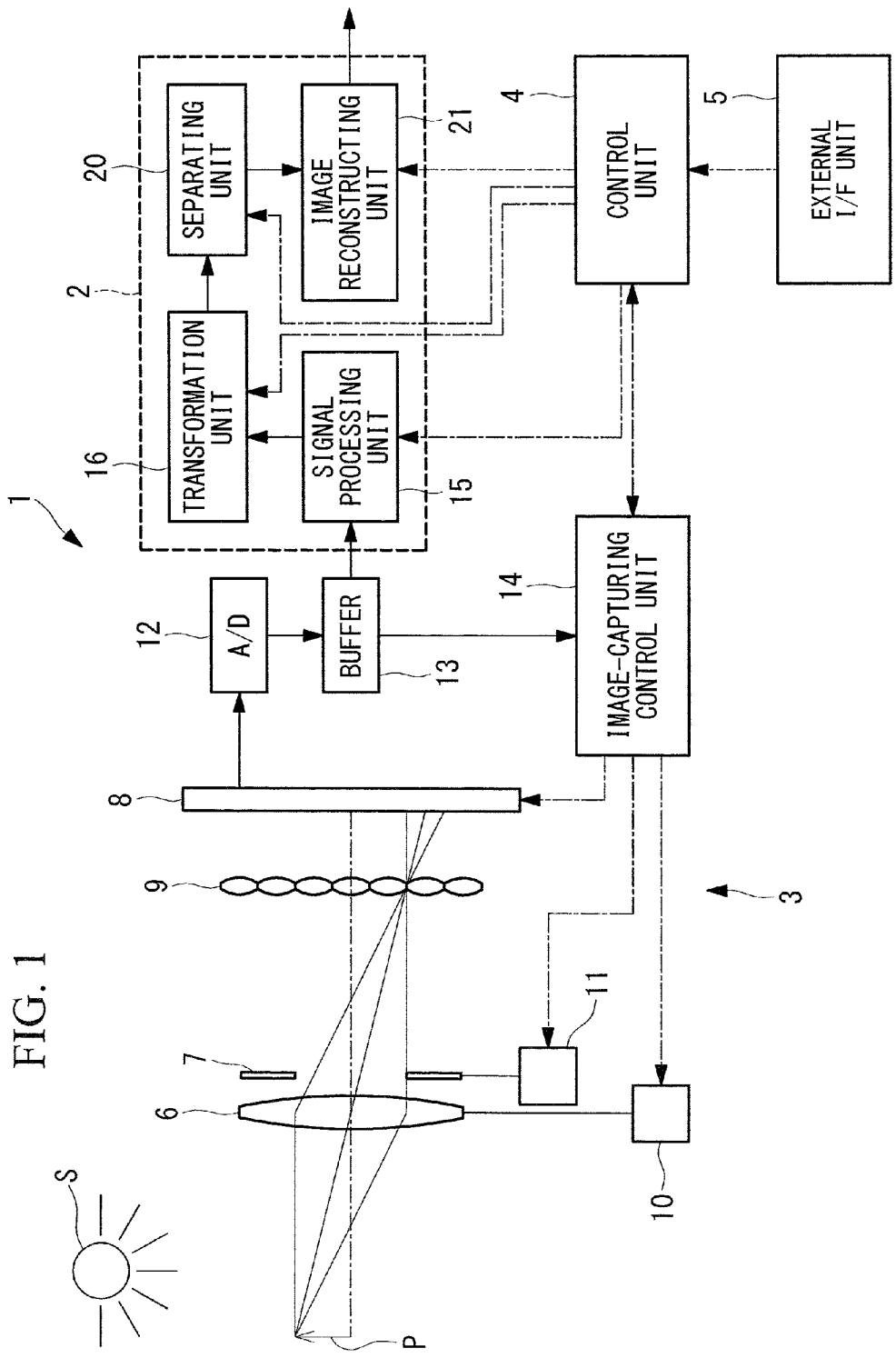
FIG. 1 is a diagram showing the overall configuration of an image processing apparatus and an image acquisition apparatus according to an embodiment of the present invention.

As shown in FIG. 1, the image acquisition apparatus 1 according to this embodiment is a camera and is provided with an image obtaining unit 3, an image processing apparatus 2, a control unit 4 that controls these units, and an external I/F unit 5 that receives external inputs.

The image obtaining unit 3 is provided with: an image capturing lens 6 that collects light emitted from a light source S and reflected at a subject P; a diaphragm 7; an image-capturing element 8 that captures the light collected by the image-capturing lens 6; a microlens array 9 that is disposed between the image-capturing element 8 and the image-capturing lens 6 and that is formed by two-dimensionally arraying a plurality of microlenses in directions intersecting the optical axis of the image-capturing lens 6; an AF motor 10 that moves the image-capturing lens 6 in the optical axis direction; a diaphragm motor 11 that changes the aperture diameter of the diaphragm 7; an A/D conversion unit 12 that converts the image signal obtained by the image-capturing element 8 into a digital signal; a buffer 13 that stores the converted digital signal; and an image-capturing control unit 14.

Image-capturing conditions such as the ISO sensitivity and exposure are set via the external I/F unit 5, and a shutter button (not illustrated) is half-pressed, thereby entering a pre-capturing mode and performing pre-capturing with the image-capturing element 8. The pre-captured image signal obtained by this pre-capturing is converted to a digital signal by the A/D conversion unit 12, is stored in the buffer 13, and is sent to the image-capturing control unit 14.

The image-capturing element 8 is, for example, a single-plane CCD using the RGB primary color system. A CMOS device may also be used as the image-capturing element 8.

The image-capturing control unit 14 calculates the focal distance on the basis of the pre-captured image signal and drives the AF motor 10 to move the image-capturing lens 6 in the optical axis direction so as to focus on the subject P. In addition, the image-capturing control unit 14 calculates the size of the aperture of the diaphragm 7 or the electronic shutter speed of the image-capturing element 8 for adjusting the amount of incident light, according to a luminance level in the pre-captured image signal or a luminance level obtained by using a luminance sensor (not illustrated).

Then, the shutter button is fully pressed via the external I/F unit 5, thereby performing image capturing. At this time, the AF motor 10, the diaphragm motor 11, and the image-capturing element 8 are controlled on the basis of the focal distance or exposure conditions determined in the image-capturing control unit 14, and these items of information during image capturing are sent to the control unit 4.

The microlens array 9 is disposed at a position where a real image of the subject P is formed. Then, the real image formed at the microlens array 9 is further projected onto the image-capturing element 8. By doing so, at the image-capturing element 8, it is possible to obtain an image signal in which a plurality of parallax images is arranged in the form of an array. The image signal obtained by the image-capturing element 8 is converted to a digital signal by the A/D conversion unit 12, and is then stored in the buffer 13.

The image processing apparatus 2 is provided with a signal processing unit 15 that reads single-plane image signals stored in the buffer 13, performs known demosaicing processing and white-balance processing thereon, and creates an RGB three-plane image signal.

The image processing apparatus 2 is also provided with a transformation unit 16 that transforms the image signal processed in the signal processing unit 15.

Figure 2:
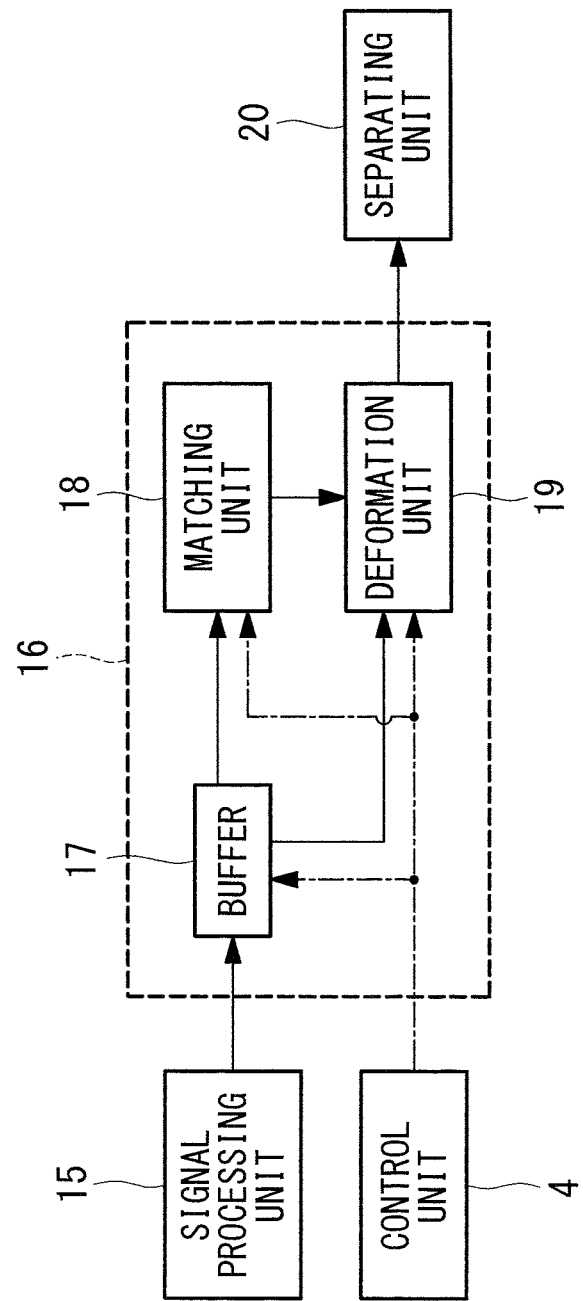
FIG. 2 is a block diagram showing a transformation unit in the image processing apparatus in FIG. 1.

As shown in FIG. 2, the transformation unit 16 is provided with a buffer 17 that stores the image signal sent thereto from the signal processing unit 15, a matching unit 18 that performs known matching processing on each local region in a plurality of parallax images sent from the buffer 17, and a deformation unit 19 that performs a projection transformation so that corresponding points between image signals are matched.

The matching unit 18 sets a single reference image from among the plurality of parallax images and performs matching processing of the other parallax images with this reference image. Via this matching processing, corresponding points between the plurality of parallax images and the reference image are obtained.

Figure 3:
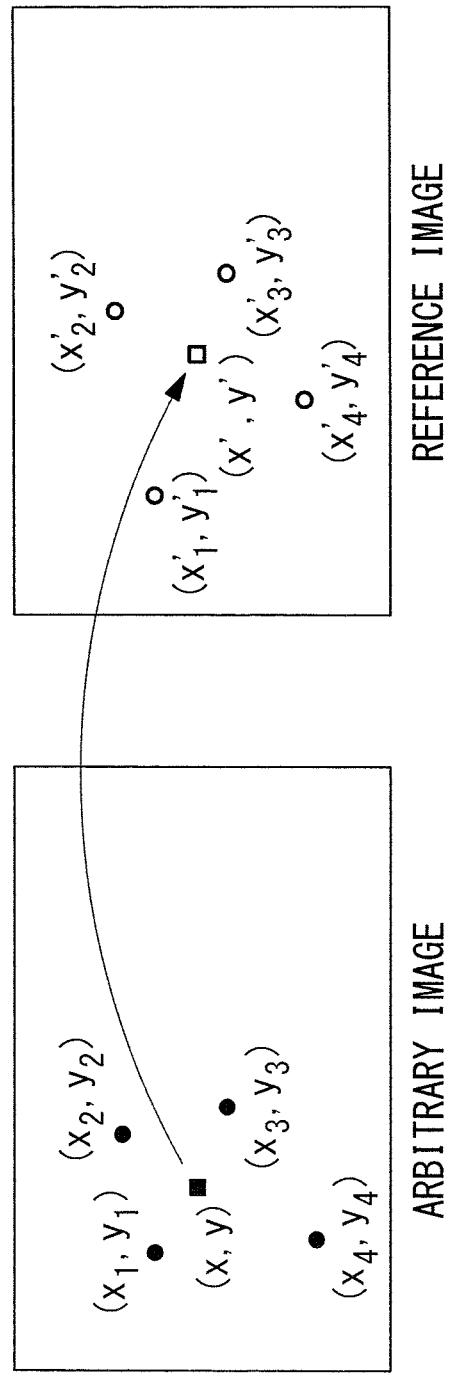
FIG. 3 is a diagram for explaining the operation of a deformation unit in the transformation unit in FIG. 2.

Then, as shown in FIG. 3, when the coordinates of four points in an arbitrary image among the plurality of parallax images are $(x_1, y_1)$, $(x_2, y_2)$, $(x_3, y_3)$, and $(x_4, y_4)$, respectively, and the coordinates of the corresponding points of the above four points in the reference image are $(x'_1, y'_1)$, $(x'_2, y'_2)$, $(x'_3, y'_3)$, and $(x'_4, y'_4)$, respectively, the coordinates $(x', y')$ after transformation of the coordinates in the arbitrary parallax image by the deformation unit 16 are given by Equation (1), using a projection transformation matrix.

$$\begin{bmatrix} x' \\ y' \\ 1 \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} x \\ y \\ 1 \end{bmatrix} \quad (1)$$

Here, $a_{11}$ to $a_{33}$ represent matrix elements of the projection transformation matrix, and if the coordinate relationships of the four points between the two images are known, they can be uniquely determined by eliminating a scaling factor degree of freedom. The scaling factor is set, for example, to 1. Since the coordinate relationships of the four points between each parallax image and the reference image are obtained in the matching unit 16, it is possible to obtain the projection transformation matrix in Equation 1, and positioning to the reference image is performed by performing a projection transformation of the parallax images other than the reference image by using Equation 1.

In addition, the image processing apparatus 2 is provided with a separating unit 20 that separates specular-reflection components from the plurality of transformed images transformed in the transformation unit 16 and images from which the specular-reflection components have been removed, and an image reconstructing unit 21 that combines at least one of the plurality of specular-reflection components separated by the separating unit 20 and the images from which the specular-reflection components have been removed.

Figure 4:
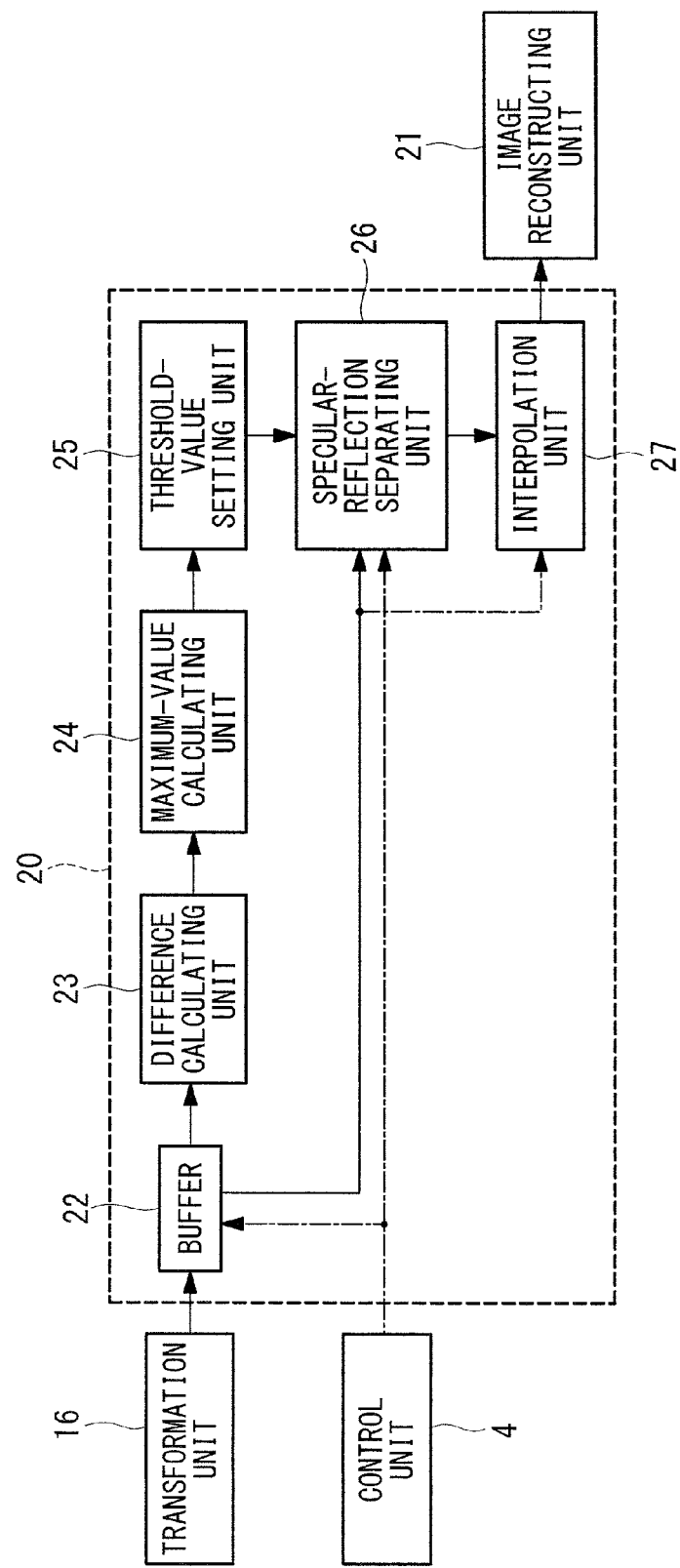
FIG. 4 is a block diagram showing a separating unit in the image processing apparatus in FIG. 1.

As shown in FIG. 4, the separating unit 20 is provided with a buffer 22 that stores the transformed images sent thereto from the transformation unit 16, a difference calculating unit 23 that creates difference images between the reference image and other transformed images stored in the buffer 22, a maximum-value calculating unit 24 that creates a maximum-value image from the difference images created by the difference calculating unit 23, a threshold-value setting unit 25 that extracts a threshold value t from the maximum-value image created by the maximum-value calculating unit 24, a specular-reflection separating unit 26 that separates a specular-reflection component from each of the transformed images using the threshold value t extracted by the threshold-value setting unit 25, and an interpolation unit 27 that creates an image from which the specular-reflection component has been removed by interpolating the reference image from which the specular-reflection components has been separated.

The difference calculating unit 23 creates the plurality of difference images by subtracting the other transformed images from the reference image, according to Equation (2) below.

$$Di(x,y) = |K(x,y) - Si(x,y)| \quad (2)$$

Here, $Di(x,y)$ represents the image signal of the i-th difference image, $K(x,y)$ represents the image signal of the reference image, and $Si(x,y)$ represents the image signal of the i-th transformed image.

Figure 5:
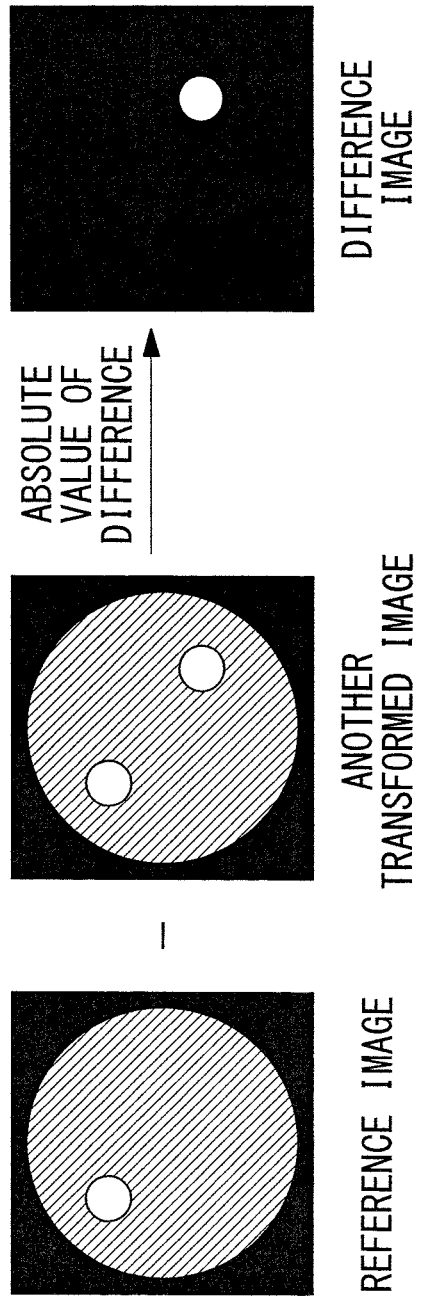
FIG. 5 is a diagram for explaining the operation of a difference calculating unit in the separating unit in FIG. 4.

As shown in FIG. 5, with this difference calculating unit, the other transformed images are subtracted from the single reference image selected from among the plurality of transformed images, and in regions in the other transformed images where the pixel values are large, a region that does not overlap the region in the reference image where the pixel values are large is created as a difference image in each transformed image (the white part in the difference image in FIG. 5 is the difference region).

The maximum-value calculating unit 24 calculates the maximum value of the pixel values in each corresponding image on the basis of the plurality of difference images created by the difference calculating unit 23, using Equation (3) below.

$$M(x,y)=\max(Di(x,y), \forall i) \tag{3}$$

Here, M(x,y) represents the image signal of the maximum-value image.

Figure 6:
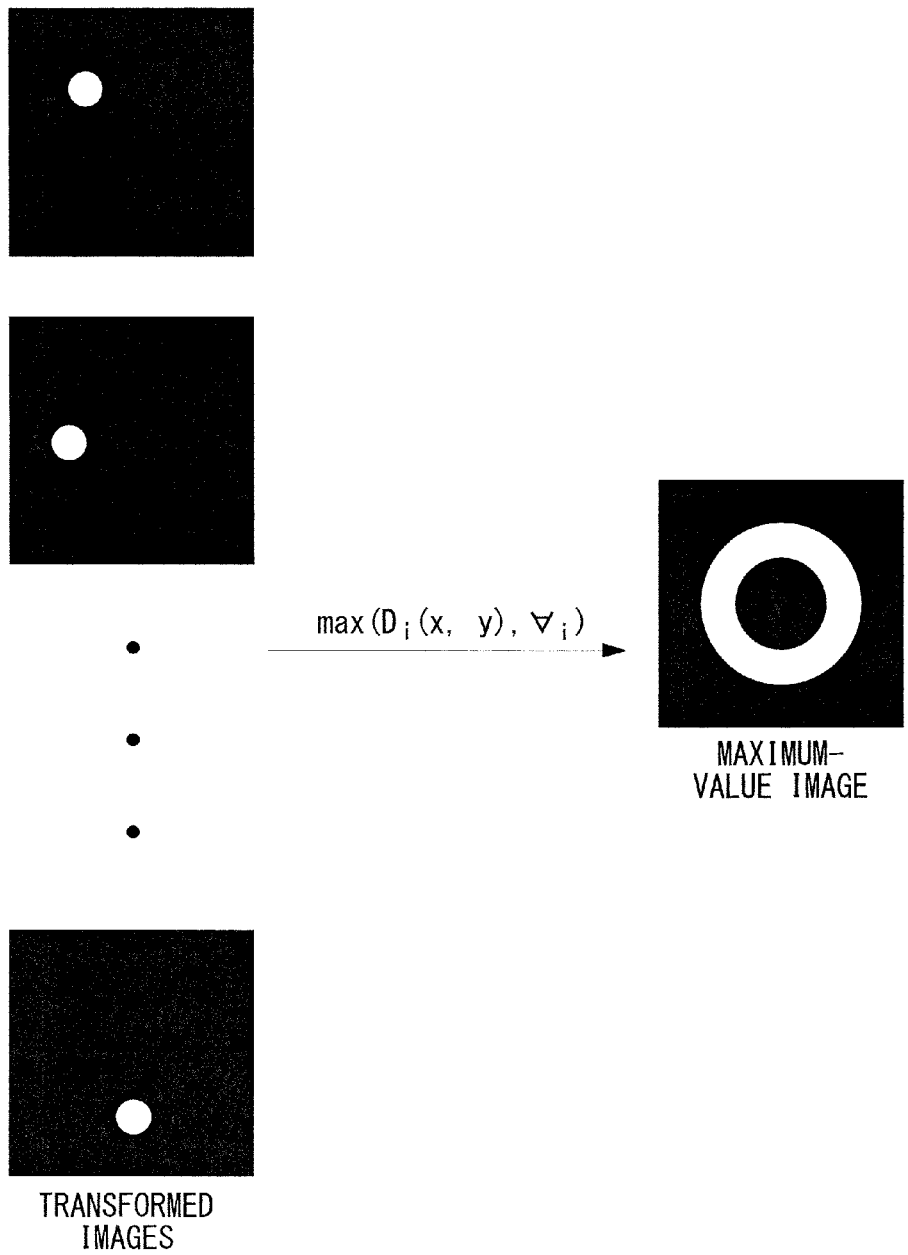
FIG. 6 is a diagram for explaining the operation of a maximum-value calculating unit in the separating unit in FIG. 4.

With this maximum-value calculating unit 24, as shown in FIG. 6, a maximum-value image in which only the maximum values at each pixel in the plurality of difference images are collected is created.

Figure 7:
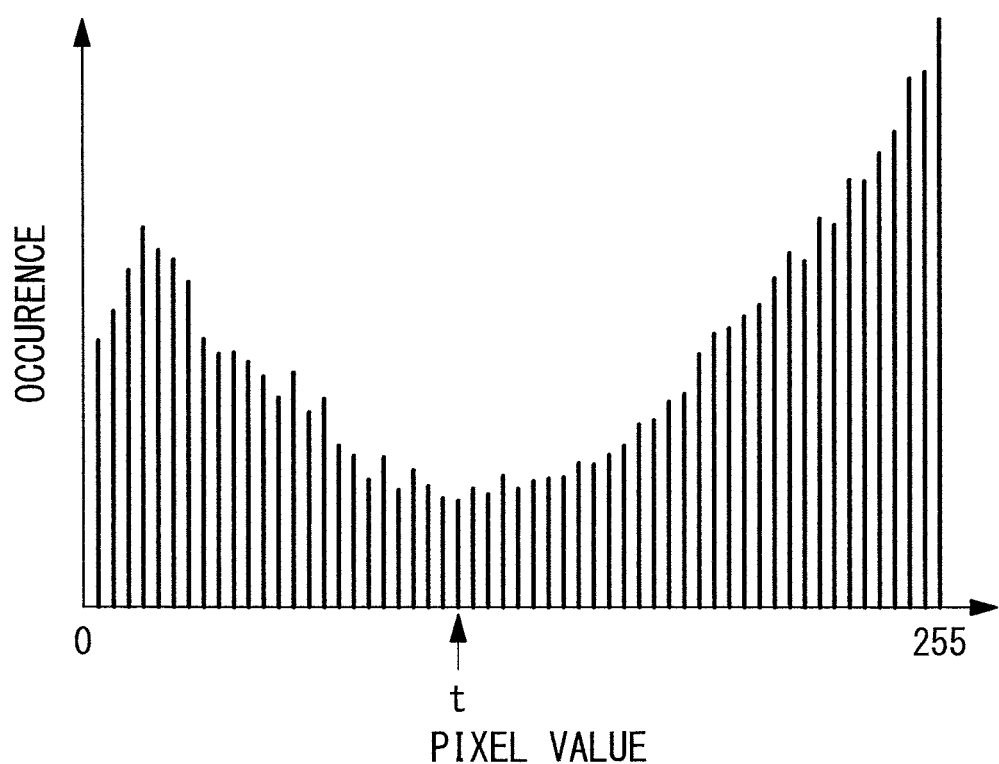
FIG. 7 is a diagram for explaining the operation of a threshold-value setting unit in the separating unit in FIG. 4.
Figure 8:
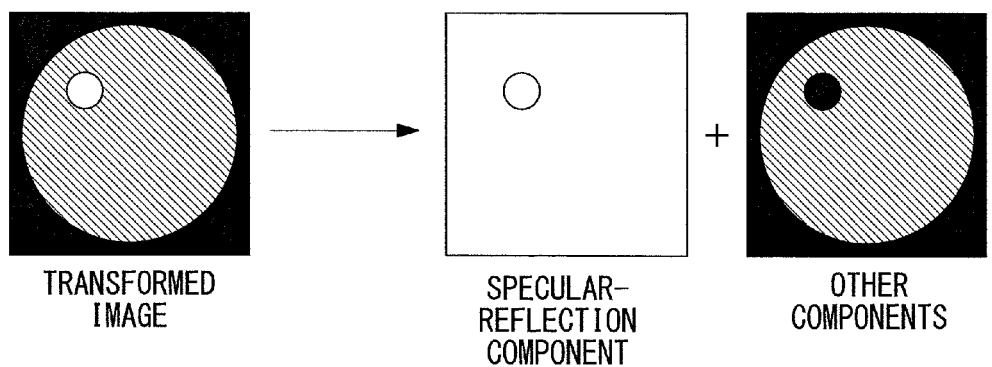
FIG. 8 is a diagram for explaining the operation of a specular-reflection separating unit in the separating unit in FIG. 4.

As shown in FIG. 7, the threshold-value setting unit 25 creates a histogram of the image signals of the maximum-value image, and by using a known decision analysis method, As shown in FIG. 8, using the threshold value t set in the threshold-value setting unit 25, the specular-reflection separating unit 26 defines components at or above the threshold value t in the plurality of transformed images, including the reference image, as specular-reflection components, and separates them from the other components. In addition, regarding the reference image, the specular-reflection separating unit 26 sends the other components, from which the specular-reflection components have been separated in the same way, to the interpolation unit 27.

Figure 9:
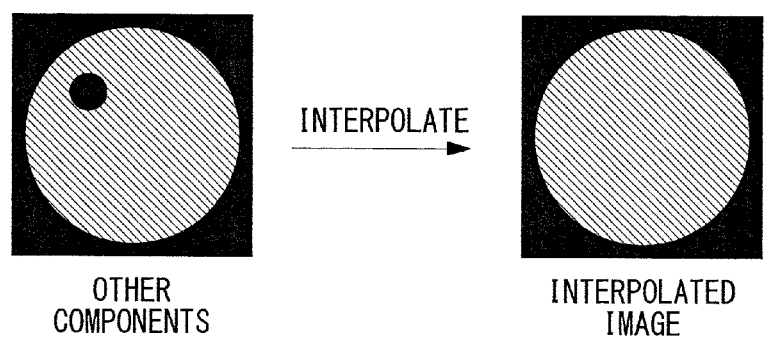
FIG. 9 is a diagram for explaining the operation of an interpolation unit in the separating unit in FIG. 4.

The interpolation unit 27 interpolates a region from which the specular-reflection component among the other components of the reference image sent thereto has been removed, as shown in FIG. 9, to create an interpolated image. As the interpolation method, known bilinear method or bicubic method may be used, or Image Inpainting described in the following reference may be used.

"Image Inpainting", Bertalmio, M. and Sapariro, G. and Caselles, V. and Ballestar, C., Proceeding of the 27$^{th}$ annual conference on Computer graphics and interactive techniques, pp. 417-424, (2000)

The plurality of specular-reflection components separated in the specular-reflection separating unit 26 and the interpolated image subjected to interpolation processing in the interpolation unit 27 are sent to the image reconstructing unit 21.

The image reconstructing unit 21 adds the specular-reflection component specified according to an input from the external I/F unit 5 and the interpolated image to combine them.

Figure 10:
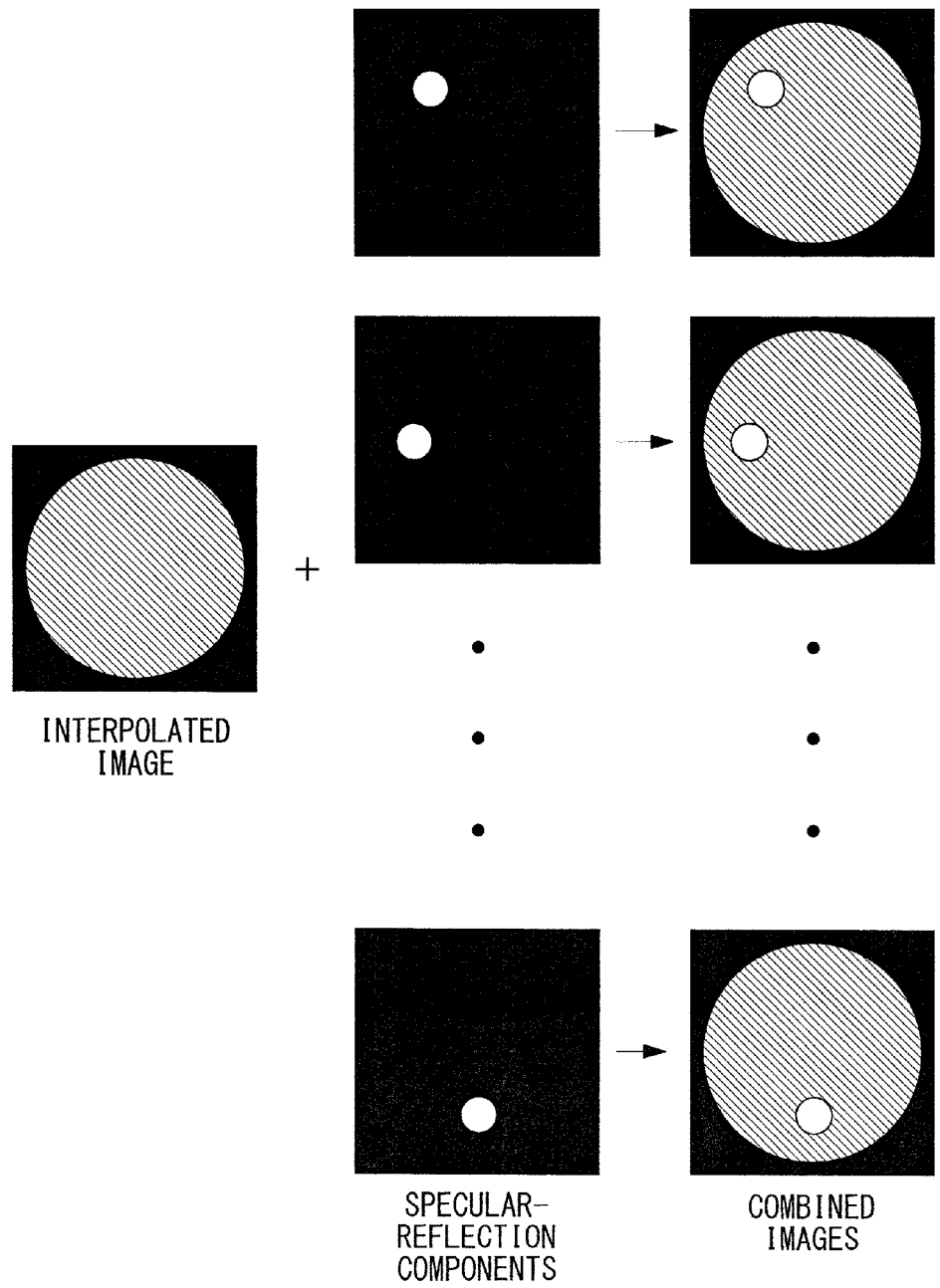
FIG. 10 is a diagram for explaining an example of the operation of an image reconstructing unit in the image processing apparatus in FIG. 1.

In the image reconstructing unit 21, by changing the specular-reflection component to be combined with the interpolated image, as shown in FIG. 10, an advantage is afforded in that, even though the position of a light source S is not actually moved, it is possible to obtain a combined image in which the position of the light source S is virtually moved.

Figure 11:
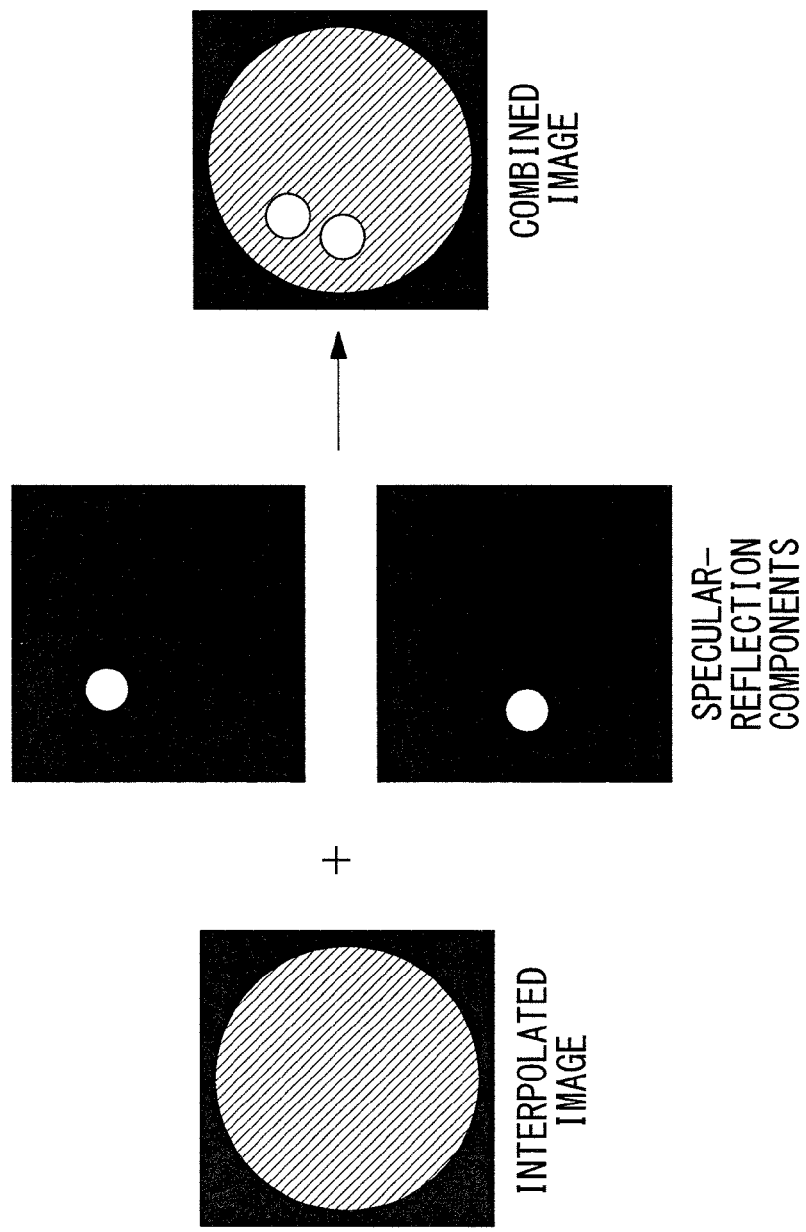
FIG. 11 is a diagram for explaining another example of the operation of the image reconstructing unit in the image processing apparatus in FIG. 1.

In addition, when a plurality of specular reflection components for combining is specified by an input from the external I/F unit 5, even though the number of light sources is actually 1, as shown in FIG. 11, it is possible to obtain a combined image that appears to be acquired with a plurality of light sources S disposed virtually.

Figure 12:
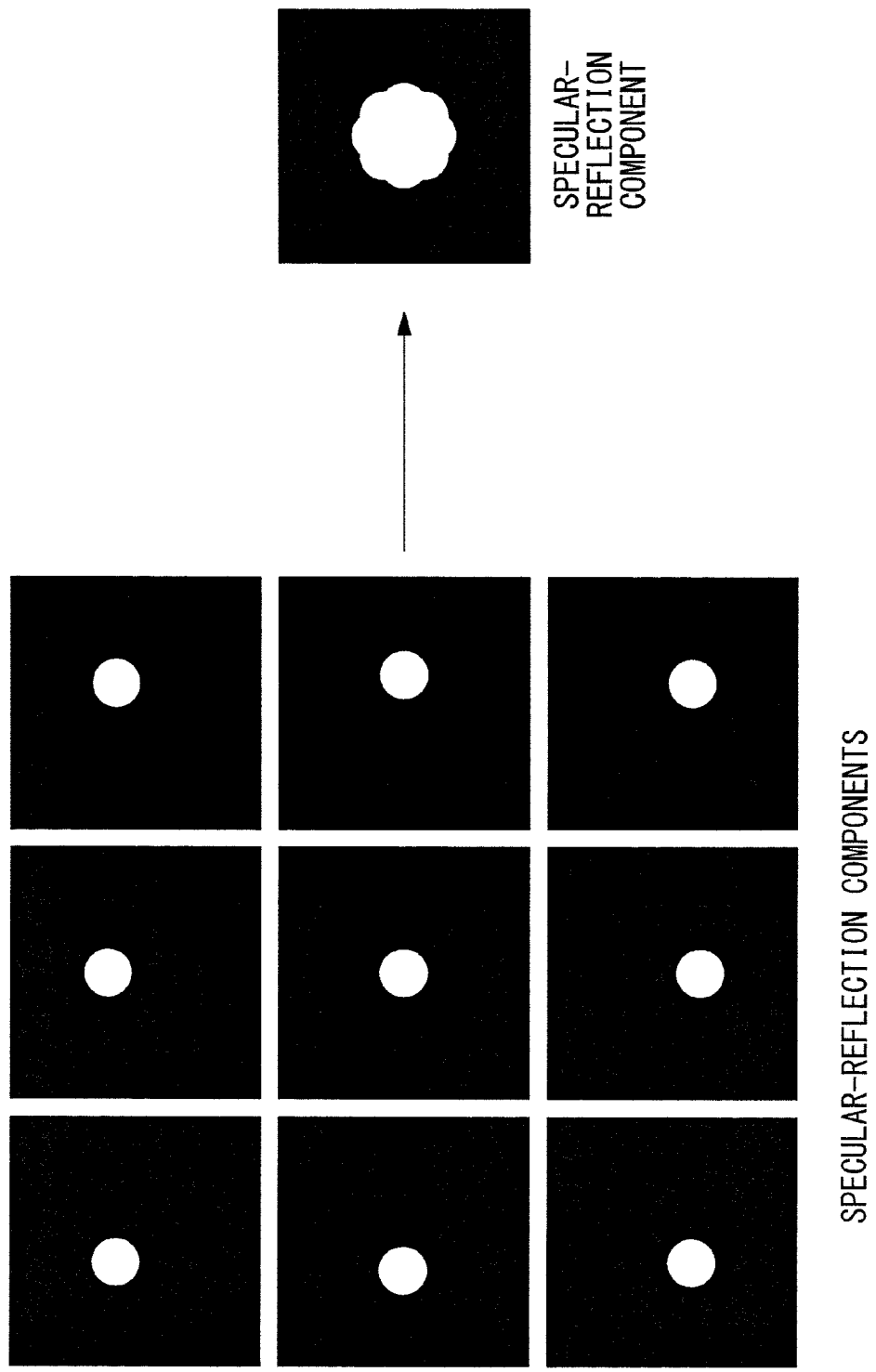
FIG. 12 is a diagram for explaining an operation for combining a plurality of specular-reflection components.

Furthermore, as shown in FIG. 12, a plurality of specular-reflection components that overlap each other so as to neighbor the specified specular-reflection component in the up, down, left, and right directions are combined, and as shown in FIG. 13, by adding them to the interpolated image, it is possible to create an image in which the focal position of the specular-reflection component is virtually shifted. By simultaneously combining a plurality of specular-reflection components whose parallaxes are shifted, it is possible to achieve the same effect as if the focus is shifted.

The image processing apparatus 2 can be realized on a computer.

In this embodiment, a case where the image processing apparatus 2 is provided in the image acquisition apparatus 1 has been described; however, the image processing apparatus 2 may be realized by an external computer that is independent of the image acquisition apparatus 1 that obtains a plurality of images with different parallaxes.

In addition, this embodiment has been illustrated with an example case in which a real image of the subject P is formed on the microlens arrays 9; instead of this, however, as shown in FIG. 14, a real image of the subject P may be formed between the image-capturing lens 6 and the microlens 9 and then re-imaged on the image-capturing element 8 by the microlens array 9.

In this embodiment, the microlens array 9 is used to obtain a plurality of parallax images; instead of this, however, a plurality of cameras (not illustrated) may be arranged in an array in directions intersecting the optical axis. In addition, image capturing may be performed a plurality of times while moving a single camera (not illustrated) in directions intersecting the optical axis.

Furthermore, in this embodiment, to obtain the threshold value t for separating the specular-reflection component, the threshold value t is extracted from the histogram of the maximum-value image by using a known decision analysis method; instead of this, however, an arbitrary threshold value t that the user sets may be used, or Y symbols converted to a YCbCr signal may be used as the pixel values in the histogram, as shown in Equation 2. Also, the G signal may be used as is.

$$\begin{bmatrix} Y \\ Cb \\ Cr \end{bmatrix} = \begin{bmatrix} 0.299 & 0.587 & 0.114 \\ -0.169 & -0.331 & 0.500 \\ 0.500 & -0.419 & -0.081 \end{bmatrix} \begin{bmatrix} R \\ G \\ B \end{bmatrix} \tag{4}$$

As a result, the above-described embodiment leads to the following aspects.

An aspect of the present invention is an image processing apparatus including: a transformation unit that is configured to deform images so that corresponding points in a plurality of images obtained from several viewpoints with respect to the same subject are matched; a separating unit that is configured to separate specular-reflection components from the plurality of images transformed by the transformation unit and create an image from which the specular-reflection component is removed; and an image reconstructing unit that is configured to combine at least one of the specular-reflection components of the plurality of images, separated by the separating unit, and the image from which the specular-reflection component is removed.

With this aspect, after a plurality of images having parallax, obtained by capturing the same subject from different directions, is deformed by the transformation unit so that corresponding points are matched, they are separated by the separating unit into a specular-reflection component and an image from which the specular-reflection component is removed. Accordingly, a plurality of images in which only the specular-reflection components are extracted and an image from which the specular-reflection component is removed are created, and therefore, by combining the image from which the specular-reflection component is removed and any one of the specular-reflection components using the image reconstructing unit, it is possible to create an image in which the light source position is moved virtually, without moving the light source.

In the above-described aspect, the separating unit may include: a difference-image creating unit that is configured to create a difference image between a reference image selected from the plurality of transformed images transformed by the transformation unit and another transformed image; a threshold-value setting unit that is configured to set a threshold value on the basis of the difference image created by the difference-image creating unit; a reflection-component separation that is configured to extract the specular-reflection components from the plurality of transformed images by using the threshold value set by the threshold-value setting unit; and a removed-image creating unit that is configured to remove, from the transformed images, the specular-reflection components extracted by the reflection-component separating unit and perform interpolation processing of the images after removal to create the image from which the specular-reflection component is removed.

By doing so, difference images between the reference image and the other transformed images are created by the operation of the difference-image creating unit. Since the position or shape of the specular-reflection component changes by a large amount according to the position of the viewing point, it is possible to extract many specular-reflection components using the difference images. Thus, in the created difference images, pixels at which the pixel value is high are assumed to represent the specular-reflection components, and therefore, by using the threshold-setting unit, it is possible to set a threshold value on the basis of the difference images, and by using the reflection-component separating unit, it is possible to extract specular-reflection components from the plurality of transformed images on the basis of the threshold value. In addition, when the specular-reflection component is removed from the transformed image by the removed-image creating unit, the removed portion forms a hole; therefore, it is possible to create an image from which the specular-reflection component is removed by filling in the hole portion by means of interpolation processing.

In the above-described aspect, the threshold-value setting unit may be configured to extract, at each pixel, a maximum pixel value in the plurality of difference images and may set the threshold on the basis of a histogram of the maximum pixel values.

By doing so, by using a plurality of difference images including many specular-reflection components and creating a histogram in which the maximum pixel values of all pixels are used, it is possible to easily set the threshold value by using a turning point in the histogram.

In the above-described aspect, the image reconstructing unit may be configured to add the image from which the specular-reflection component is removed and any one of the specular-reflection components selected from the specular-reflection components of the plurality of images.

By doing so, by adding the specular-reflection component at an arbitrary viewpoint position to the image from which the specular-reflection component is removed, it is possible to select the light source position virtually to create an image illuminated from an arbitrary direction.

In the above-described aspect, the image reconstructing unit may be configured to add the image from which the specular-reflection component has been removed and a plurality of the specular-reflection components selected from the specular-reflection components of the plurality of images.

By doing so, by adding the plurality of specular-reflection components at arbitrary viewpoint positions to the image from which the specular-reflection component is removed, it is possible to select the number and positions of the light sources virtually, and to create an image illuminated from arbitrary directions.

In the above-described aspect, the image reconstructing unit may be configured to add the image from which the specular-reflection component has been removed and a plurality of the specular-reflection components disposed at positions that overlap each other, selected from the specular-reflection components of the plurality of images.

By doing so, the region of the specular-reflection component in the image is increased in size, which allows creation of an image in which the viewpoint position of the specular-reflection component is shifted virtually.

Another aspect of the present invention is an image acquisition apparatus including an image obtaining unit that is configured to a plurality of images with several viewpoints with respect to the same subject; and one of the above-described image processing apparatuses.

With this aspect, the plurality of images from several viewpoints with respect to the same subject, obtained by the image obtaining unit, is processed by the image processing apparatus, whereby it is possible to create an image in which the position of the light source is changed virtually.

In the above-described aspect, the image obtaining unit may include a plurality of cameras arranged in an array in directions intersecting the optical axis.

By doing so, it is possible to easily obtain a plurality of images having parallax, with a plurality of cameras.

In the above-described aspect, the image obtaining unit may include an image-capturing lens that collects light from the subject; an image-capturing element that captures the light collected by the image-capturing lens; and a microlens array disposed between the image-capturing element and the image-capturing lens and formed by arraying a plurality of microlenses two-dimensionally in directions intersecting the optical axis.

By doing so, it is possible to easily obtain, with one shot, an image in which a plurality of parallax images is arranged in an array, by using a single image-capturing lens.

The present invention affords an advantage in that it is possible to obtain, in a simple manner, an image in which the position of a light source is moved virtually, without performing image acquisition while moving the light source.

REFERENCE SIGNS LIST

P subject
1 image acquisition apparatus
2 image processing apparatus
3 image obtaining unit
6 image-capturing lens
8 image-capturing element
9 microlens array
16 transformation unit
20 separating unit
21 image reconstructing unit
23 difference calculating unit
25 threshold-value setting unit
26 specular-reflection separating unit
27 interpolation unit

The invention claimed is:

1. An image processing apparatus comprising:
a transformation unit that is configured to deform images so that corresponding points in a plurality of images obtained from several viewpoints with respect to the same subject are matched;
a separating unit that is configured to separate specular-reflection components from the plurality of images transformed by the transformation unit and create an image from which the specular-reflection component is removed; and
an image reconstructing unit that is configured to combine at least one of the specular-reflection components of the plurality of images, separated by the separating unit, and the image from which the specular-reflection component is removed.

2. An image processing apparatus according to claim 1, wherein the separating unit comprises: a difference-image creating unit that is configured to create a difference image between a reference image selected from the plurality of transformed images transformed by the transformation unit and another transformed image; a threshold-value setting unit that is configured to set a threshold value on the basis of the difference image created by the difference-image creating unit; a reflection-component separation unit that is configured to extract the specular-reflection components from the plurality of transformed images by using the threshold value set by the threshold-value setting unit; and a removed-image creating unit that is configured to remove, from the transformed images, the specular-reflection components extracted by the reflection-component separating unit and perform interpolation processing of the images after removal to create the image from which the specular-reflection component is removed.

3. An image processing apparatus according to claim 2, wherein the threshold-value setting unit is configured to extract, at each pixel, a maximum pixel value in the plurality of difference images and sets the threshold on the basis of a histogram of the maximum pixel values.

4. An image processing apparatus according to claim 1, wherein the image reconstructing unit that is configured to add the image from which the specular-reflection component is removed and any one of the specular-reflection components selected from the specular-reflection components of the plurality of images.

5. An image processing apparatus according to claim 1, wherein the image reconstructing unit that is configured to add the image from which the specular-reflection component has been removed and a plurality of the specular-reflection components selected from the specular-reflection components of the plurality of images.

6. An image processing apparatus according to claim 1, wherein the image reconstructing unit that is configured to add the image from which the specular-reflection component has been removed and a plurality of the specular-reflection components disposed at positions that overlap each other, selected from the specular-reflection components of the plurality of images.

7. An image acquisition apparatus comprising an image obtaining unit that is configured to obtain a plurality of images with several viewpoints with respect to the same subject; and an image processing apparatus according to claim 1.

8. An image acquisition apparatus according to claim 7, wherein the image obtaining unit comprises a plurality of cameras arranged in an array in directions intersecting the optical axis.

9. An image acquisition apparatus according to claim 7, wherein the image obtaining unit comprises an image-capturing lens that collects light from the subject; an image-capturing element that captures the light collected by the image-capturing lens; and a microlens array disposed between the image-capturing element and the image-capturing lens and formed by arraying a plurality of microlenses two-dimensionally in directions intersecting the optical axis.

* * * * *